UNITED STATES PATENT OFFICE.

CARLETON ELLIS, OF MONTCLAIR, NEW JERSEY.

CEREAL FOOD AND PROCESS OF MAKING SAME.

1,382,963.　　　　　Specification of Letters Patent.　Patented June 28, 1921.

No Drawing.　　Application filed May 16, 1919. Serial No. 297,573.

*To all whom it may concern:*

Be it known that I, CARLETON ELLIS, a citizen of the United States, and a resident of Montclair, in the county of Essex and State of New Jersey, have invented certain new and useful Improvements in Cereal Foods and Processes of Making Same, of which the following is a specification.

This invention relates to a cereal preparation and to the process of making same and relates especially to a breakfast food having desirable physiological properties.

The basis of the foodstuff is bran in its commercial form incorporated with other carbohydrates preferably of a saccharine character. Ordinarily bran is a highly unpalatable and relatively indigestible substance and an object of the present invention is to convert the bran into a form which is of a palatable and digestible nature. The bran of course should be free from dirt, and is preferably used as original flakes. This, of course, does not preclude a washing or cooking operation, or does not preclude an operation such as running through rollers to flatten out the flakes. It is to be understood that bran is generally winnowed to remove all the flour.

When bran is incorporated with sugary material, dried and browned or toasted, the bran loses a good part of its tough fibrous character and becomes crisp and readily masticated. While ordinary sugar or glucose and the like may be employed for the purpose I preferably utilize fruits containing considerable amounts of sugar such as figs, dates, prunes, raisins and the like to which, if desired, ordinary cane sugar, glucose, honey or other sugary material may be added if desired. Preferably raisins are employed with the bran and to prepare the raisins for the purpose they are preferably steamed until soft and pulpy and are then ground or beaten with the bran until thoroughly disseminated through the flakes. When the raisins are cooked for a sufficient period the skins become quite soft and a considerable amount of sugar and other matter are extracted in the water in which the raisins are boiled. This material may be separately ground if desired or passed into some sort of an extruding device so that the skins of the raisins are finely comminuted. The bran is moistened with this liquor and pulpy material and after thorough incorporation preferably such that on each flake of bran one or more fine particles of raisin pulp or skin is attached while the flake itself is moistened by and impregnated with the raisin liquor (of course, containing sugary material), the product is dried and preferably parched or roasted. I call attention to the fact that this product consists essentially or largely of separate flakes rather than a cake or biscuit, although two or more of such flakes may stick together. It is desirable to regulate the temperature carefully or to stop the operation at such a point that the product is not scorched or burned. When the roasting is carried out so that the flakes are preferably browned to a desired extent without being scorched, the individual flakes of bran will be found to curl up forming a brittle product which crushes easily and masticates readily. Moreover instead of the totally unpalatable character of the original tough flakes of bran, the toasted product has a pleasant flavor very different from the original bran. The product may be made as concentrated in raisin pulp or other fruit pulp as desired but preferably not over 10 to 20% of dried raisins based on the dry weight of the bran employed is used, this quantity of raisins is boiled with water enough to cover the raisins, the boiling or steaming being carried out for an hour or so until a soft pulp is obtained. The raisins employed should preferably be seeded prior to use. In like manner prunes or dates from which the pits have been removed may be employed or mixtures of these fruits in order to impart different flavors to the bran. As stated above it is also possible to add sugar, glucose, honey or other sweetening agents and in like manner malt extract may be used in whole or in part as the sweetening agent. When such a sweetening agent is employed with the fruit material it is desirable to use at least twice as much of the fruit product as of the sugar, etc.

While it is possible also to incorporate with the bran other food materials such as cereals of various types, malted or unmalted so as to make various modifications of the present invention, in the preferred form the invention consists of a composition having bran as the essential or main cereal ingredient and a fruit product or sweetening agent as a crisping and flavoring agent such food composition being preferably parched or roasted to a crisp browned state possessing a desirable flavor. Preparations containing equal parts by weight of bran and raisins may be prepared when a preponderating raisin flavor is desired, while in other cases and in the preferred form not over 10 to 20% of raisin material is used. The invention contemplates not only products of this character but also embraces the process of making such products, that is the method of making a crisp palatable product from bran by roasting in the presence of a crisping agent, namely sugar or fruit products of a sweet character. In its more detailed phases the invention involves the cooking of a fruit product such as raisins, figs or prunes with water to produce a pulp which if desired may be ground or comminuted in case the fruit skins require such treatment and the pulp and liquid mixed with the cereal material which preferably is entirely bran. The mixture is thoroughly agitated to incorporate the sugar or fruit material and preferably a sufficient amount of liquor is employed to wet the bran throughout so that each flake soaks up a small quantity of the sugary substance. The product is dried and then is preferably roasted as indicated to produce the crisp curled up flakes of the desired brownish or yellowish color. Ordinarily bran is composed of more or less flat flakes or scales which are very tough and difficult to masticate as indicated. In the preferred form of the new product these normally flat bran flakes are curled more or less being in some cases slightly warped and in other cases curled up into a cylindrical form. Between these are found flakes of intermediate shapes. The amount of curling will depend on a number of factors, such as temperature of the drying and toasting or roasting operation, amount of liquid absorbed by the bran flakes, sugar concentration in such absorbed liquid, etc. The present invention embraces a product of this character that is to say one containing curled flakes of bran.

What I claim is:—

1. The process of making a cereal preparation adapted for use as a human food which comprises soaking an amount of bran in a liquid containing a lesser amount of sugary material and without destroying the structure of the bran, and drying the product at a temperature high enough to produce a curling of the bran flakes.

2. The process of making a foodstuff adapted for human consumption which comprises cooking dried fruit with water to form a pulp, agitating the pulp with a quantity of bran flakes in excess of the quantity of fruit, whereby the latter is moistened by the fruit liquid and the fruit pulp is distributed throughout the mass, drying and toasting to a brownish color whereby crisp flakes of a curled structure are obtained.

3. The process of making a product intended for human consumption which comprises admixing pulp of fruit containing sugary material with a quantity of bran flakes in excess of the quantity of fruit whereby the latter is moistened by the liquids of the pulp and the latter is distributed throughout the mass and in strongly drying the product to produce crisp flakes having a curled structure.

4. As a food product, crisp, curled-up, original flakes of bran, such flakes being impregnated with sugary material.

5. As a food product, crisp, curled-up, original flakes of bran, coated and impregnated with sugary material including fruit pulp, such product being toasted to a brownish color.

CARLETON ELLIS.